May 11, 1926.
E. F. CHANDLER
1,584,356
LIMIT CONTROL SYSTEM
Filed March 18, 1924    3 Sheets-Sheet 1

Inventor
Edward F. Chandler
By his Attorney
Guido M. Lauridsen

May 11, 1926.

E. F. CHANDLER

LIMIT CONTROL SYSTEM

Filed March 18, 1924

Inventor
Edward F. Chandler
By his Attorney
Guido M. Sacerdote

May 11, 1926.  
E. F. CHANDLER  
LIMIT CONTROL SYSTEM  
Filed March 18, 1924  
1,584,356  
3 Sheets-Sheet 3

Inventor  
Edward F. Chandler  
By his Attorney  
Guido M. Sacerdote

Patented May 11, 1926.

1,584,356

UNITED STATES PATENT OFFICE.

EDWARD F. CHANDLER, OF BROOKLYN, NEW YORK.

LIMIT CONTROL SYSTEM.

Application filed March 18, 1924. Serial No. 700,074.

This invention relates to improvements in methods and apparatus for overload control of devices in which a predetermined amount of travel is required; and it more particularly refers to methods of and apparatus for remote control of valves and other devices in which a predetermined to-and-from travel is required, such as, for instance, a bulkhead door, a railway switch or signal, a gun turret, a lock gate, and many other devices of various character.

In three previous applications for patent on remote control systems, No. 578,402, filed July 29, 1922; No. 590,854, filed September 27, 1922; and No. 646,749, filed June 21, 1923, and in another application for patent on apparatus for remote control. No. 690,757, filed February 5, 1924, I have described various types of apparatus adapted for the operation of devices of the kind mentioned, and suitable for remote control from one or more stations; and I also have described electrical circuits for connecting the apparatus to the controlling station or stations, and to a source of electric supply.

The apparatus therein described, all comprise an operating unit including a reversible electric motor, and suitable driving mechanism operated thereby, together with suitable timing devices arranged to terminate the driving action when the driven member has reached the predetermined limit set for its travel; and the same also comprise various accessory devices, for the operation of signaling and safety appliances intended to assist in the general operation of the apparatus under various conditions.

In all the said circuits, the controlling devices at the control station are inserted in series on the main motor circuit, with the result that the entire operating current must circulate throughout the installation.

In another application for patent on methods of and apparatus for remote control, No. 676,358, filed Nov. 22, 1923, I have described a method of controlling operating devices of the kind mentioned, entailing the employment of a secondary light duty three wire circuit, for connecting the operating devices to the controlling station or stations.

The main problem connected with the operation of such devices is the accurate stopping of their operation at the proper time. It is essential that full operation thereof be provided for; and it is equally essential that undue jamming or strain of the moving and other parts of the apparatus be prevented. To achieve these ends, in my previous applications Nos. 578,402 and 590,854, I have described timing devices of an accurate design, whereby the current may be cut off at the right moment, and the moving parts stopped by braking action.

In my application No. 646,749 I have described an apparatus including a special type of slip clutch which is controlled by the load, and which in its turn will cut off the current in the motor circuit, when the resistance encountered causes the clutch to slip. However, since there may be overloads due to jamming or to friction at intermediate points of the travel of the driven member, mechanical devices are inserted changing the clutch into a positive clutch during the course of the operation, and allowing its slipping action to take place only when the end of the operation in one or the other direction is about to be reached.

In order to avoid the complications of design entailed by such an arrangement, in my other application No. 676,358 I have described a similar method of mechanical overload control through the employment of a slipping clutch, where the control of the clutch operation to render its action positive or slipping, is achieved by electro-magnetic means. This not only simplifies the design of the apparatus, but it also furnishes a more accurate means of timing the release of the clutch from positive into slipping.

In other appliances of a kindred nature, such for instance as the one described in the patent of L. A. Tirrill, electrically operated valves, Serial No. 845,281, the overload control is exerted solely on electrical appliances forming part of the circuit, so that the operation of the valve is dependent entirely upon electrical conditions, an overload coil being relied upon for opening the motor circuit, when the closing of the valve causes an increase in the load.

There is no control of any kind on the mechanical connections between the motor and the driven unit, and there is no interdependence between electrical and mechanical conditions; so that if undue resistance is met with at an intermediate point of the valve's travel, the operation may be stopped before the travel has been completed.

While simplicity of design makes an overload coil control highly desirable, the above conditions constitute serious limitations to its possibilities. Furthermore, another serious drawback is the fact that the circuit is interrupted when the current is above normal; arcing is therefore liable to occur at the breaking point, with consequent damage to switches and other elements in the circuit.

In fact, not only is it desirable to avoid increases in the normal current when the circuit is being interrupted at the switch, but it is highly desirable that the load be decreased, and with it the current, before such interruption takes place; or better still, that the load be entirely off when interruption at the switch takes place.

There is another condition, that an ordinary overload coil control does not satisfy, where no separate direct control of the operating circuit exists. In such a case, the opening of the circuit is entirely dependent upon the existence of overload conditions; and assuming that the necessity should arise to stop the travel of the valve at an intermediate point, where no overload conditions occur, the overload coil alone, would clearly be found wanting.

The principal object of the present invention, is to provide a method of circuit control, whereby an overload coil may be used to advantage in interrupting the circuit after full completion of the travel of the driven member, but is rendered inoperative while the driven member is moving from one extreme end of its travel to the other; so that the operation may proceed uninterrupted from beginning to end, even if some frictional or other resistance at some intermediate point should cause the load to rise above normal.

Another object of this invention is to provide a method of circuit control entailing the use of an overload coil, but at the same time insuring operation of the switch at all times, under the control of the operator or of the limit switch, independently of the load conditions in the circuit.

A further object is to provide a novel and improved arrangement of various elements, whereby my method may be carried into practice in connection with apparatus adapted for secondary circuit control.

Other objects and advantages of the present invention will more fully appear as the description proceeds, and will be set forth in the appended claims.

In the drawings:

Fig. 4 is a side view in elevation, partly sectioned, of a unit type of apparatus adapted for the operation of valves and the like;

Figure 1:
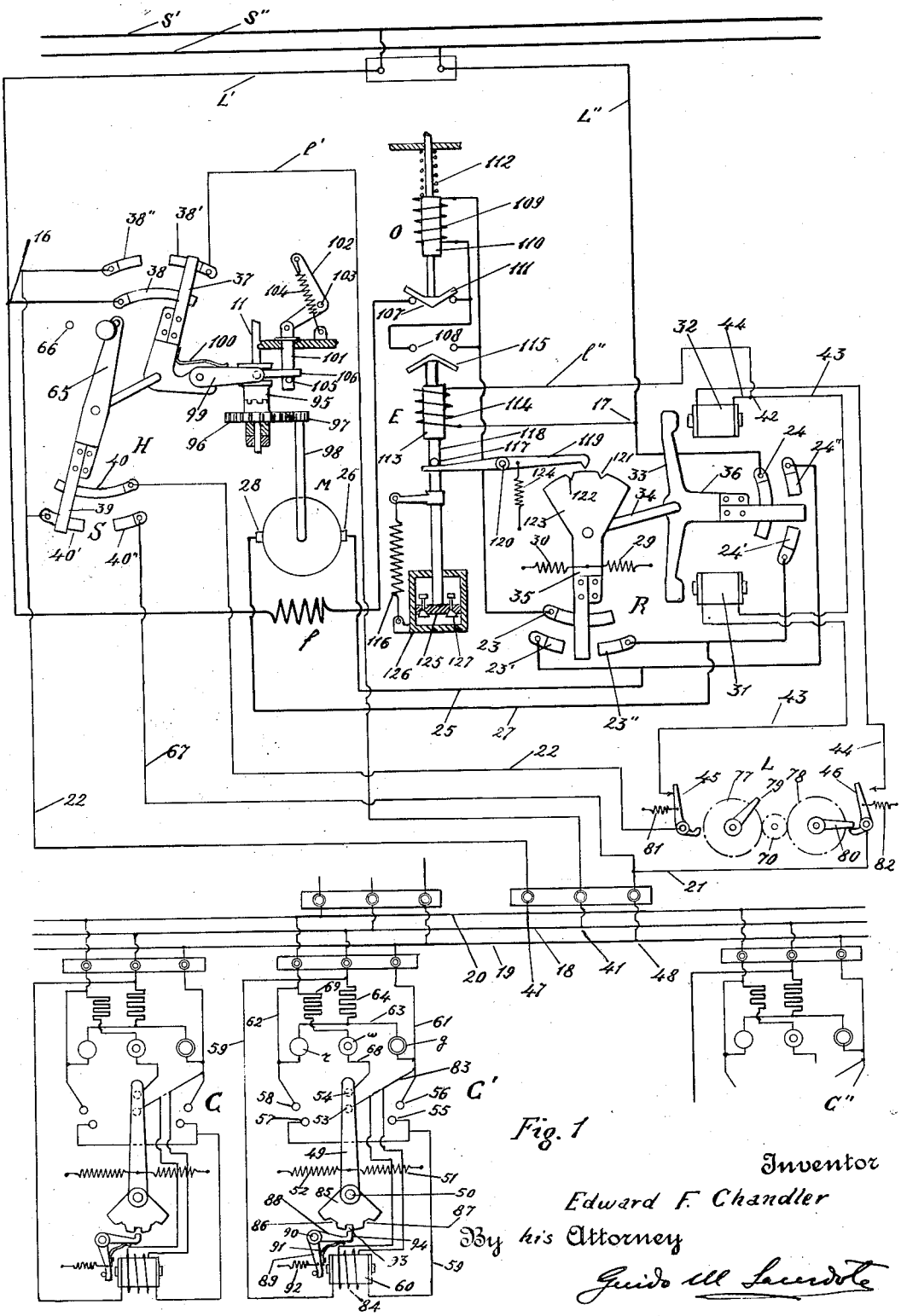
Fig. 1 is a diagrammatic illustration of a system of valve control, comprising an operating or main circuit and a secondary controlling circuit, showing one way of carrying my invention into practice.

The operating mechanism illustrated in the drawings comprises an enclosed electric motor M, which, through mechanism hereinafter described, operates a countershaft 11, which countershaft, through suitable gearing 12, 13, (see Fig. 4) operates a power take-off shaft 14.

The entire mechanism is enclosed in a casing or box B, which is detachably mounted by means of bolts 15 on a flange F integral with or secured to the valve housing.

The casing also contains the main circuit connections, including a reversing switch R, an electro-magnetic circuit interrupter E and an overload coil O, and also contains a limit switch L inserted in the secondary controlling circuit, and means H for setting the device from motor to hand operation and vice-versa.

The control from distant points is effected by means of controllers C, C', C'', etc., located at various convenient points, and inserted in the secondary controlling circuit.

Referring to Fig. 1, S', S'' designate the wires of a power circuit constituting the source of electric supply.

L', L'', are the two lines of the operating circuit attached thereto, and l', l'' are two smaller lines shunted therefrom at 16, 17, leading to, and feeding the three wire secondary control circuit constituted by wires 18, 19, 20. In this, wires 19, 20, are respectively fed by wires 21, 22, which are both fed by line l'', while wire 18 is fed by line l' directly.

The main, or operating circuit, consists of line L' leading to the field f of the motor, and from the field to the contact plate 23 of the reversing switch; line L'' leading to another contact plate 24 of said reversing switch; a wire 25 connecting contact plates 23', 24'' of the reversing switch with one of the poles 26 of the motor armature; and a wire 27 connecting contact plates 23'', 24' of the reversing switch with the other pole 28 of the motor armature.

The reversing switch is shown in its neutral position, in which position it is normally held by two antagonistic springs 29, 30, and its operation is controlled by the secondary circuit, by means of electromagnets 31, 32, causing armature 33, integral with the switch, or mounted on the same shaft 34, to swing in one or the other direction, as one or the other of said electromagnets is energized.

If electromagnet 31 is energized, the switch arms 35, 36, will move in a counter-clockwise direction, and will respectively connect contact plate 23 with contact plate 23″, and contact plate 24 with contact plate 24″; the current will therefore flow through line L′, field f, plate 23, plate 23″, wire 27, armature pole 28, armature pole 26, line 25, plate 24″, plate 24, line L″.

If electromagnet 32 is energized instead, the switch arms will move in a clockwise direction, and will respectively connect plate 23 with plate 23′ and plate 24 with plate 24′; and the current will go through the motor armature in a reverse direction, thereby reversing the sense of rotation of the motor, flowing through line L′, field f, contact plate 23, contact plate 23′, line 25, armature pole 26, armature pole 28, line 27, contact plate 24′, contact plate 24, and line L″.

The means for setting the apparatus for manual operation, comprise a double throw switch S, which is shown in its normal position when the device is set for motor operation. In this position, one of the contact bars of the switch, 37, closes the circuit of line l′, which is connected to contact plates 38, 38′ of the switch, and the other contact bar, 39, closes the circuit of line 22, which is connected to contact plates 40, 40′.

The secondary controlling circuit proper, therefore, consists of a line l′, attached at 16 to main line L′, and a wire 18 connected to the same at 41; a line l″ attached at 17 to main line L″, and branching out at 42 into two lines 43, 44, respectively in series with the coils of electromagnets 31, 32, and leading respectively to contact arms 45, 46, of the limit switch L. Through said contact arms, said lines 43, 44 may be respectively connected to lines 22, 21, leading respectively to wires 20, 19, to which they are attached at 47, 48.

Said secondary circuit includes furthermore one or more control stations C, C′, C″, located at different points, so that the device may be set in operation or stopped from any one of the said stations.

Said control stations each include a controller arm 49, pivoted at 50, and adapted to be held at a central position, as shown, by the action of two antagonistic springs 51, 52, bridging contact points 53, 54. Said arm may also be moved to the right so as to bridge contact points 55, 56, or to the left so as to bridge contact points 57, 58.

When the device is set for motor operation, and switch S is in the position shown, the central position of arm 49 is its neutral position, and no current flows through the secondary circuit, contact points 53, 54, being of the same polarity. In fact, contact point 53 is connected to wire 19, which is in its turn connected to line 21, and contact point 54 is connected to wire 20, which is in its turn connected to line 22; and both lines 21, 22, lead to the same line l″ through switch arms 46, 45, wires 44, 43, and electromagnets 32, 31.

When controller arm 49 is moved to the right, current in the secondary circuit will flow, provided contact arm 46 of the limit switch is in its closed position, through line l′, wire 18, wire 59 in which is inserted the coil of an electromagnet 60, contact point 55, contact point 56, wire 61, wire 19, wire 21, limit switch arm 46, line 44, electromagnet 32, and line l″; electromagnet 32 will therefore be energized, causing clockwise movement of the reversing switch.

When controller arm 49 is moved to the left, if contact arm 45 of the limit switch is closed, current will flow in the secondary circuit through line l′, wire 18, wire 59, electromagnet 60, contact point 57, contact point 58, wire 62, wire 20, wire 22, limit switch arm 45, line 43, electromagnet 31, and line l″; electromagnet 31 will therefore be energized, causing counter-clockwise movement of the reversing switch.

From the above it is also seen that current will flow through wire 19 when contact arm 46 is closed, and through wire 20 when contact arm 45 is closed. Indication of this condition for either or both arms, is given by the energization of signal means, for instance lamps g and r, inserted in their respective circuits, by bridging wires 61, 62 by means of another wire 63, and by connecting the same to wire 59 by means of a resistance 64.

Independently of the position of the controller arm, therefore, if contact arm 46 of the limit switch is closed, a small amount of current, sufficient to energize the lamp g, will flow through circuit l″, 18, 64, 63, lamp g inserted in circuit 63, 61, 19, 21, 46, 44, 32, l″; and in a similar manner, if contact arm 45 is closed, a small amount of current, sufficient to energize lamp r, which is inserted in circuit 63, will flow through circuit l′, 18, 64, 63, lamp r, 62, 20, 22, 45, 43, 31, l″. If both arms 45 and 46 are closed, both lamps will be energized at the same time. For convenience, lamp g may be green, and lamp r may be red, so that the condition of the limit switch may be quickly recognized.

If lever 65, by means of which the device may be set for manual operation, is set at its other position 66, the connections of the secondary circuit will be somewhat changed by switch S. Circuit l' will be interrupted, and in its stead, line L' will be connected to wire 22, and therefore to wire 20, through contact plates 38, 38''; and connection between wire 22 and contact arm 45 will be interrupted, and in its stead said arm 45 will be connected to wire 21, and therefore to wire 19, through contact plates 40, 40'', and a connecting wire 67.

Contact point 54, which is bridged to contact point 53 when the controller arm 49 is in neutral, as shown, is connected to wire 20 through a wire 68, in which a white lamp w is inserted, resistance 69, and wire 62. In the new position of switch S, current will flow through wire 22, wire 20, 62, 69, 68, lamp w, 54, 53, 61, 19, through one or the other or both contact arms 45, 46 (through 67, 45, or through 21, 46), line l''. Wire 18 is disconnected from the circuit, and therefore both lamps g and r will be de-energized.

White lamp w stands therefore to indicate that the device is set for manual operation. In a general way, the connections so far described are similar to those shown in connection with the diagram of application No. 676,358, and the general mode of operation is also the same, as follows:

The limit switch L is operated by a pinion 70, which is connected by suitable gearing to the power take-off shaft 14. This gearing consists of worm 71, integral with said power take-off shaft, a worm wheel 72 in mesh therewith mounted on a shaft 73, a gear wheel 74 also mounted on said shaft, and a gear wheel 75 in mesh therewith, mounted on shaft 76, on which pinion 70 is also mounted.

Said pinion is in mesh with two gears 77, 78, carrying fingers 79, 80, respectively adapted to operate contact arms 45, 46, by causing them to interrupt their respective circuits, when said fingers 79, 80, reach a given position due to the rotation of gears 77, 78. Gears 77, 78, rotate in the same direction, and the relative position of the fingers to the contact arms is such that when finger 79 moves towards contact arm 45, finger 80 moves away from contact arm 46.

Pinion 70, and with it gears 77, 78, rotate in one or the other direction, according to whether the valve is being opened or closed. Tension springs 81, 82, normally maintain contact arms 45, 46, in their closed position.

In the limit switch position shown in Fig. 1, connection between wires 44, 21, is interrupted, contact arm 46 being forced open by finger 80. Contact arm 45 is in its closed position, and connects wire 43 to wire 22. The controller arm is in neutral position. Current flows through line l', wire 18, 64, 63, lamp r, 62, wire 20, 22, 45, 43, electromagnet 31, and line l''; therefore the red lamp is lighted, and indicates that the valve is set at one of its extreme positions, say the closed position. The amount of current passing through the circuit, however, is small, owing to the combined resistance of lamp r and resistance 69, and is insufficient to energize electromagnet 31; no operation of the reversing switch will therefore follow.

If the controller arm is moved towards the right, so as to bridge contact points 55, 56, no change will take place, because the circuit of wire 19, connected thereto, is interrupted at 46; said controller arm can therefore only be moved towards the lamp which is burning. By so doing, the current will continue to flow through the circuit described, but will also flow through wire 59, contact points 57, 58, and wire 62, forming a circuit external to lamp r and resistance 69, and therefore the intensity of the current will now be such that electromagnet 31 will be energized, and switch R will swing in a counter-clockwise direction.

Current will therefore flow through the main circuit, and the motor M will rotate so as to open the valve, causing at the same time clockwise rotation of pinion 70, and counter-clockwise rotation of gears 77, 78. Soon after the motor has thus been started, finger 80 has released contact arm 46, and also green lamp g will now be energized. The burning of both the red and the green lamp at the same time, thus indicates that the valve is in motion from one of its extremes to the other, the direction of the movement being indicated by the position of the controller arm.

The limit switch is so adjusted, that finger 79 will interrupt the circuit of electromagnet 31 when the travel of the valve is completed, by forcing open contact arm 45; de-energization of electromagnet 31, and release thereby of the reversing switch, will follow, spring 30 returning the reversing switch to neutral; the operation of the motor will therefore cease, and the valve will remain in the open position. When contact arm 45 is forced open, the red light goes off, and only the green light will appear, indicating valve open. If now the controller arm is set to the right, the reverse will take place, the valve will again be closed, and the circuit will resume the condition illustrated in the drawing.

In several important details, however, the present arrangement departs from the one formerly disclosed, and contains features which are new, and which constitute the basis of the present invention.

Figure 2:
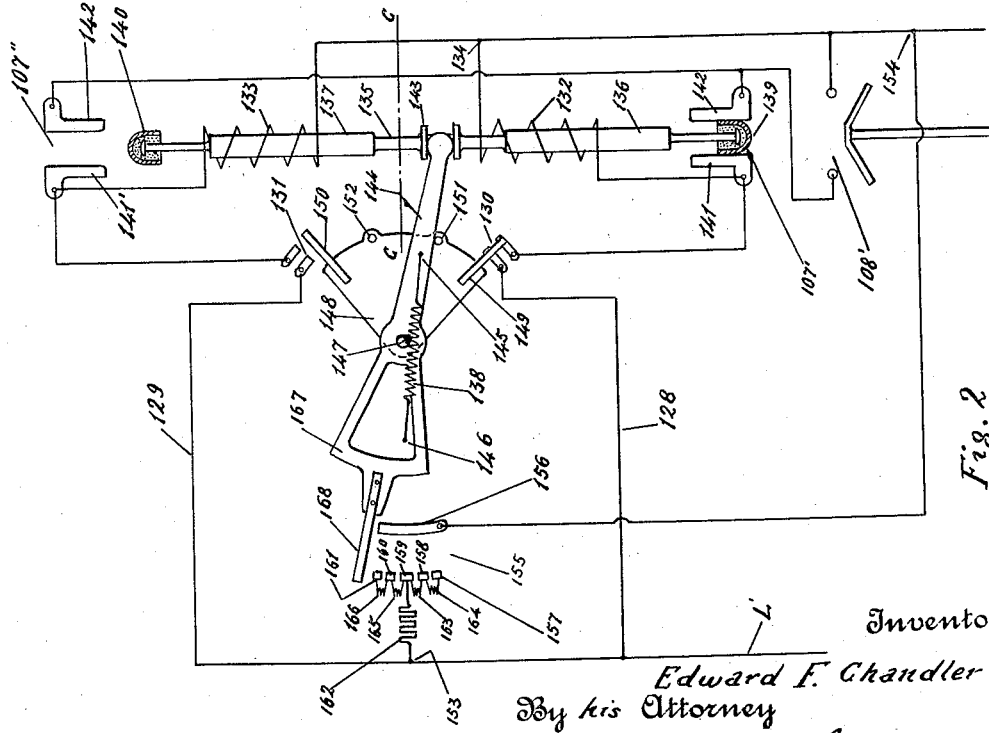
Fig. 2 is a fragmentary diagrammatic illustration of a modified type of overload coil control, whereby a resistance may be inserted into the circuit by the operation of the overload coil, previous to the interruption of the circuit.

One of the features, at the controlling stations, is a modification of an arrangement shown in Fig. 2 of my application No. 690,757, where no secondary control circuit is used, and relates to a safety device preventing the operation of the controller when lever 65 is set for manual operation.

When only one unit is used, with a plurality of controlling stations, such a device is unnecessary, because wire 18 will be disconnected when lever 65 is operated, as explained; no current will therefore reach contact points 55, 57, and nothing happens if the controller arm at any one of the control stations is moved to the right or to the left while the white light is showing.

However, if more than one unit is used, for simultaneous control by any one of a plurality of controlling stations, there is the possibility of one unit being set for manual operation, while the other unit or units in the system remain set for motor operation. Their local secondary circuits would therefore remain unchanged, and wire 18 would through the same remain connected to line S'.

As long as all the controller arms remain in neutral, there is no danger, the circuit of wire 18 being interrupted at 55, 57; the condition of the circuit will be indicated by the white lamps burning, and by either the red or the green lamps burning at the same time. If, however, notwithstanding this signal, one of the controller arms should inadvertently be operated towards the side lamp which is burning, one of two things may happen: either the controller arm is thrown to the left if the red light is burning, and all the units will be operated, with the exception of the one set for hand operation, because its circuit 62 is now of the same polarity as wire 18, being connected to L' through 22, 38'', 38; but the position of the other units in relation to the one set for hand operation will become reversed, and trouble is liable to be experienced with the signaling system afterwards. Or else, the controller arm is thrown to the right, and all the units will be motor operated, including the one which is set for hand operation, with danger for the attendant which may at the time be operating or repairing it.

When two or more units are used, it is therefore important that the possibility of such an occurrence be prevented. Consequently, if only one unit is used, I prefer to connect contact point 53 directly to wire 61, by means of a link 83, as shown in dotted lines; and if more than one unit is used, I prefer to insert in link 83 an extra coil 84, wound around electromagnet 60, and adapted to energize it when current flows through link 83. Said electromagnet under normal conditions, is energized by the current flowing through wire 59, when the controller arm is thrown into one of its operating positions.

The controller arm, 49, is provided with a segment 85, formed with two notches 86, 87, adapted to be engaged by a pawl 88 when the controller arm is set at one or the other of its extreme positions. The engagement will come through the action of electromagnet 60, which, being energized, will attract its armature 89, pivoted at 90, which armature will force pawl 88 inwardly by means of a spring 91. Said spring is strong enough to maintain the controller arm in its operative position, against the action of spring 51 or 52; but notches 86, 87, being formed with beveled sides, as shown, said spring 91 will yield if the controller arm is returned by hand to its neutral position. This permits the reversal of the valve's motion at any time. Armature 89 is normally maintained detached from the core of the electromagnet by a spring 92, holding pawl 88 disengaged from segment 85', as shown.

Said segment 85' is furthermore provided with a central notch 93 having parallel sides, and adapted to be positively engaged by square tip 94 of pawl 88; so that if tip 94 interlocks with notch 93, controller arm 49 will be positively locked in position, and no hand operation of the same will be possible.

Electromagnet 60 will only be energized while controller arm 49 is in its neutral position, if by setting one of the units for manual operation, current is caused to flow through the white lamp circuit, including link 83, in the manner explained. At such time, therefore, armature 89 will be attracted, and all the controller arms will be locked in their neutral position by their respective pawls 88, preventing all possibility of their operation.

Another new feature introduced into the present arrangement, is the insertion of extra resistances 64, 69, in the signal lamps circuits. In the previous arrangements the resistance of the lamps was relied upon to cut down the intensity of the current passing through the secondary circuit when the controller arm is in neutral, to a point where no energization of the electromagnets controlling the reversing switch may occur. However, this does not prevent the possibility of one of the lamps being replaced, if broken, by one of greater capacity, through ignorance or inadvertence; with the result that energization of the reversing switch controlling electromagnets, may no longer be prevented by its resistance.

I have therefore added resistances 64, 69, in series with the lamps, insuring at all times conditions whereby energization of electromagnets 31, 32, will be prevented when controller arms 49 are in neutral, independently of the internal resistance of the lamps.

Another new feature is introduced in connection with the clutch whereby the motor may be connected to the operating mechanism. Such a connection is effected by means of a clutch sleeve 95, slidably keyed on countershaft 11, adapted to be connected to or disconnected from a gear 96 loose on said shaft, and operated by a pinion 97 mounted on the motor shaft 98.

In some of the devices forming the object of my previous patent applications, the clutch was of the positive interlocking type, adapted to be operated only by the hand lever, such as 65, for setting the device for manual operation; and in others, the clutch was of a type adapted for positive or for slipping action, but also adapted to be controlled, whenever desired in a similar manner. The connection between the hand lever and the lever 99 operating the clutch sleeve is in all cases made yielding in the connecting direction, through a spring member 100, in order to permit reinstatement of the electrical connections for motor operation by returning the hand lever to its normal position, even if the projections of the clutch sleeve should perchance abut against the projections of the opposite clutch member.

No means have heretofore been shown, however, for disconnecting the operating mechanism from the motor without at the same time altering the electrical connections by means of the switch S. Conditions may quite conceivably arise where it is desirable to do this; for instance, after repairs, or for testing purposes, it might at times be useful to test the electric circuit without operating the valve.

Figure 4:
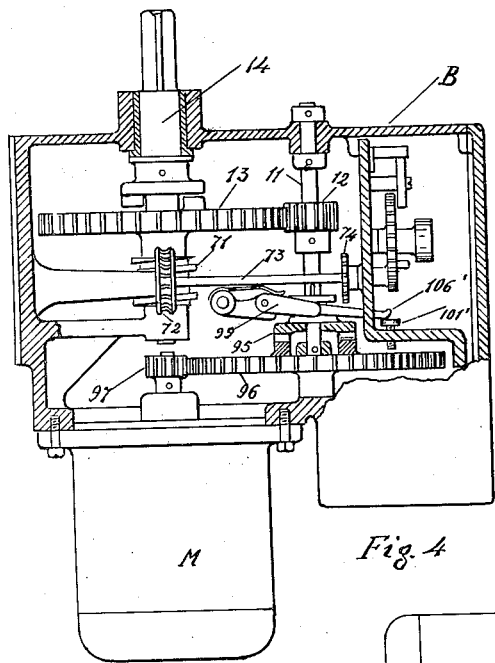
Figure 7:
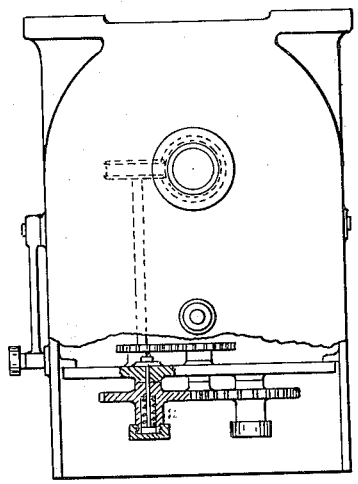
Fig. 7 is a plan view of the same, partly sectioned and broken away.

To this end, I have therefore provided means, whereby the clutch sleeve may be disconnected independently of the hand lever, without disturbing the electrical connections. In Fig. 1, such means are represented by a pin 101, operated by a crank lever 102, pivoted at 103, and normally maintained in its inoperative position, as shown, by the action of a snap over spring. If crank lever 102 is moved clockwise of an angle sufficient to cause spring 104 to pull at the other side of its neutral point, pin 101 will be lifted, and maintained by spring 104 in a position where its crosspin 105, engaging the underside of an extension 106 of lever 99, will cause said lever to hold sleeve 95 detached from gear 96, against the action of spring 100. In Fig. 4, such means are represented by a screw 101', abutting against the underside of an extension 106' of lever 99, and which may be operated to force open or to release clutch sleeve 95.

The most important new feature of the present invention, is the insertion of an overload coil in a novel manner, in substitution of the slip clutch connection heretofore used, so as to overcome the objectionable conditions previously discussed.

The arrangement contemplates the use of an overload coil in place of a slip clutch, on account of the simplicity of the ensuing design, and on account of the prompt response obtainable when changes in the load take place.

Furthermore, the arrangement renders the overload coil inoperative at intermediate points of the travel of the driven member, so as to prevent the possibility of the operation being interrupted midway on account of some unforeseen resistance.

In addition to this, operation of the reversing switch is assured even in case of failure of the overload coil to operate. Also, delaying means are introduced in the operation of the reversing switch so as to assure its circuit interrupting function taking place under no load or low amperage conditions. Furthermore, the arrangement permits termination and reversal of the operation at any time, independently of the overload coil.

To attain these various objects, line L' is interrupted at two places, where two point switches 107, 108, are inserted. An overload coil 109 is inserted in said line, between a point intermediate between said two switches, and a point intermediate between switch 108 and contact plate 23.

The plunger 110, of said overload coil, controls the two point switch 107 by means of a contact member 111 attached to said plunger, and normally maintains said switch closed, through the action of a spring 112. The other two point switch 108, is controlled by the core 113 of an electromagnet 114 inserted in line $l''$, by means of a contact member 115 attached to said core. A spring 116 normally maintains said core in a retracted position, causing switch 108 to remain open. In this position, a crosspin 117, inserted through stem 118 of core 113, maintains a lever 119, pivoted at 120, and adapted to engage one or the other of two notches 121, 122 provided in a segment 123 integral with the reversing switch, free of engagement with said segment, against the action of a spring 124.

The action of spring 116 in retracting core 113, is delayed by a dashpot arrangement, comprising a plunger 125, mounted on stem 118, moving within a chamber 126, and provided with valves 127 allowing free movement of the plunger towards switch 108, and delaying its movement in the reverse direction. Any other retarding means serving the same purpose may of course be used. When current flows through line $l''$, electromagnet 114 is energized, and its core is caused to move towards switch 108, closing same. Therefore during normal operation of the valve, both switches 107 and 108 are closed, and the current flows through the operating circuit.

Let us now see what happens if the current in the controlling circuit is interrupted. We may first note that by means of the above described arrangement, when current is flowing through line L', overload coil 109 is short circuited off the circuit on account of switch 108 being closed. Therefore, as long as electromagnet 114 is energized, that is, as long as the limit switch is operative, no current will pass through overload coil 109. It may also be noted, that when electromagnet 114 is energized, the reversing switch is held in its operative position not only by the action of electromagnets 31 or 32, but also by the locking action of lever 119, engaging either notch 121, or notch 122. This lever will prevent the return of the reversing switch to neutral, even if the operating electromagnet 31 or 32 becomes de-energized, and the reversing switch will not return to neutral until crosspin 117 again forces lever 119 out of engagement with sector 123.

In the movement of core 113 away from switch 108, there is a certain amount of lost motion before crosspin 117 engages lever 119; and in the meantime, the action of said core is delayed by the dashpot arrangement.

Under these conditions, when the limit switch reaches the end of its travel, the operating current in the secondary circuit is interrupted, electromagnet 114 is de-energized, and switch 108 immediately opens; however, the reversing switch is still locked by lever 119 in its operating position, and the current continues to flow through overload coil 109. If at the instant switch 108 is open there should be in the circuit a load in excess of the capacity of the overload coil, this immediately functions, and breaks the circuit at 107. In the meantime, core 113 travels towards lever 119, and eventually disengages the same from sector 123; at this time, the reversing switch will snap back to neutral, under no load, the current having been interrupted at 107; no arcing will therefore be possible at the reversing switch end.

If there is no overload, the overload coil will not function, but as soon as lever 119 is forced away from sector 123, the reversing switch will return to neutral under normal load conditions, and no arcing due to an excess of amperage will occur.

Should any undue resistance be found at intermediate points of the valve's travel, the circuit will not be interrupted by the action of the overload coil, because at such time the overload coil is short-circuited by switch 108 being closed.

By properly timing the limit switch, and the time elapsing between the opening of switch 108 and the forcing open of lever 119, the operation of the device may be so regulated, that switch 108 is opened slightly before the travel of the valve is fully completed; during the interval of time lapsing between the opening of switch 108 and the releasing of the reversing switch, the valve will be forced onto its seat, the load will consequently rise, and the overload coil will instantly interrupt the circuit, performing a function parallel to that of the slip clutch heretofore used; and the reversing switch will subsequently return to neutral under no load conditions. Should the overload coil for any reason fail to function, the interruption of the circuit will take place just the same as soon as the reversing switch is released from lever 119.

By the above arrangement, the overload coil does not exert any control whatever, as long as electromagnet 114 is energized; also, overload conditions are not necessary in order to interrupt the circuit at any time. The valve can therefore be stopped and reversed at any intermediate point of its travel, simply by operating the controller arm in the usual manner.

It follows that the reversing switch always interrupts the circuit under no load, or normal load conditions; at switch 107, however, the circuit is interrupted under overload conditions, and while overload coils are generally of a rugged construction, and built to meet just such conditions, yet it may at times be desirable to cut down the intensity of the current also at the overload coil, before the circuit is interrupted. This is especially true in connection with large installations, where considerable power is required. It may also be desirable, aside from considerations relating to prevention of arcing, to insert a resistance in the circuit at the end of the operating stroke, in order to slow down the motor, or for some other reason.

In connection with an overload coil, this should be done without disturbing the controlling action of the coil; that is, the coil should remain operative, although the insertion of a resistance obviously cuts down the amperage, which is the factor governing the action of the overload coil.

Figure 3:
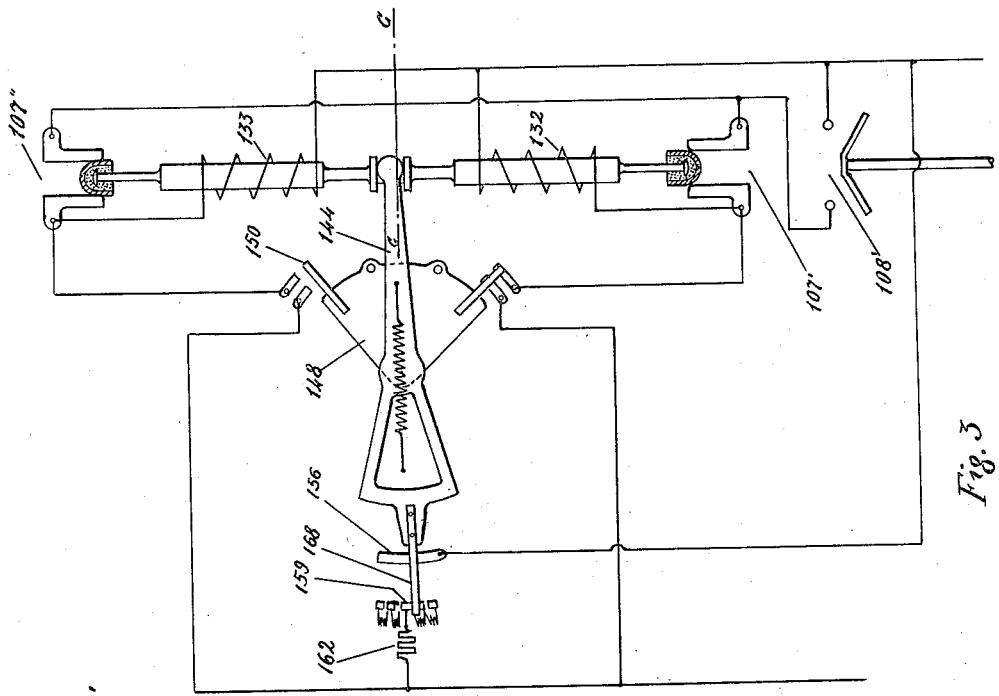
Fig. 3 is a similar illustration showing the overload coil at an intermediate point of its operation.

In Figs. 2, 3, I illustrate an arrangement whereby this object may be attained, and a resistance may be inserted in the circuit by the action of the overload coil itself, previous to the interruption of the circuit by said coil.

By this arrangement, the amperage is cut down in the overload coil circuit previous to the interruption of said circuit, without decreasing the amperage in the operating circuit; said amperage in the operating circuit being also cut down, however, as soon as the overload coil circuit is interrupted, so as to insure interruption of the operating circuit at the reversing switch under low amperage conditions.

While in the previous case interruption of the circuit at the overload coil meant interruption of the operating circuit, in the present case the operating circuit is interrupted by the reversing switch after interruption of the overload coil circuit has occurred. The operating circuit, however, may also be interrupted by the action of the overload coil, after the circuit of the overload coil itself has been interrupted.

Figs. 2 and 3 are intended to be read in connection with the main diagram in Fig. 1, and in substitution of that part of the circuit included between the field $f$, and two point switch 108 inclusive.

In said figures, L' is the line coming from the field of the motor, divided into two parallel branches 128, 129, respectively leading through switches 130, 131 to two point switches 107', 107'', taking the place of the former switch 107. Said two switches 107', 107'', are controlled by two antagonistic overload coils 132, 133, connected in continuation of said branches 128, 129, and reconnected in parallel to the delivery end of the line, at 134.

Through an arrangement which I will presently describe, one of the said coils is operative when the other is inoperative, their operation taking place in alternate succession; and for convenience of design I have shown said coils in co-axial arrangement, controlling a double plunger 135, integral with armatures 136, 137, the operation of which is partly controlled by a snap over spring 138.

Armature 136 carries a stem to which is attached a contact member 139 controlling switch 107', and in a similar manner armature 137 carries a stem to which is attached a contact member 140 controlling switch 107''. Switches 107', 107'', each comprise two elongated contact plates, 141, 142, 141', 142' necessitating a certain longitudinal travel of the plunger, before the circuit is interrupted at either end.

Plunger 135 is provided with a collar portion 143, through which is inserted the forked end of a lever 144 which is partly operated by, and partly operates said plunger.

Spring 138 is connected at 145 to said lever, and is attached at its other end to fixed point 146, in line with the central line of lever 144 when in its intermediate position. Owing to this arrangement, spring 138 acts as a snap over spring, forcing the lever 144 to move to whatever side of the said central line, point 145 has been carried by the action of the plunger.

In other words, assuming that the device be in the position shown in Fig. 2, if coil 132 is energized, armature 136 will cause movement of the plunger towards switch 107'', carrying lever 144 over central line $cc$ before the circuit is interrupted at 107'; at this point, spring 138 will cause plunger 135 to continue its movement in the same direction, to its other extreme position. The reverse will happen when, in this new position, coil 133 is energized, and armature 137 will cause movement of the plunger in the opposite direction, again carrying lever 144 over central line $cc$ before the circuit is broken at 107''.

Lever 144 is pivotally mounted at 147, and a segment 148, carrying contact arms 149, 150, respectively adapted to control switches 130, 131, is also loosely mounted on the same pivot. Said segment is also provided with two pins 151, 152, projecting in the path of lever 144, and causing segment 148 to follow the motion of said lever when said lever strikes one or the other of said pins; the distance between said pins is such, however, as to allow a major part of the travel of said lever from one of its extreme positions to the other, before disturbing the position of segment 148, so that the angular motion of segment 148 is limited to the difference between the angular motion of lever 144, and that part of lost motion thereof, which takes place from one to the other pin.

When the plunger is in the position shown in Fig. 2, lever 144 has forced segment 148 in a clockwise direction to a position where switch 130 is closed by contact arm 149. Assuming now that coil 132 be energized, the plunger, and with it lever 144, will travel in a direction away from switch 107'; segment 148, however, and consequently switch 130, will remain undisturbed until lever 144, being near to the end of its travel, strikes pin 152, and forces segment 148 to move in a counter-clockwise direction, opening switch 130, and closing switch 131.

In addition to branches 128, 129, another branch in parallel therewith leaves line L' at 153, connecting with the delivery end thereof at 154. Said branch is interrupted at 155, at which point the circuit may be completed by connecting a plate 156, to any one of additional contact plates 157, 158, 159, 160, 161. The central one of said additional plates, 159, is connected to line L' at 153 through a resistance 162; and additional resistance coils 163, 164, 165, 166 connect plate 159 to 158, 158 to 157, 159 to 160, and 160 to 161, respectively. The least resistance in said branch between 153 and 154 will therefore occur when central plate 159 is directly connected to plate 156, because connection at any other point one side or the other of central plate 159 will entail the insertion of one or more resistance coils in the circuit, the resistance increasing as connection is made further away from plate 159.

The outer end 167 of lever 144, carries a contact bar 168 which is adapted to connect plate 156 with the other plates, but which normally leaves the circuit of plate 156 open when the overload coil is inoperative, as shown.

When through the opening of switch 108′ the over load coil which is inserted in the circuit becomes operative, lever 144 moves around its pivot, as explained, and causes contact bar 168 to first close the parallel circuit between 153 and 154 through one of the extreme plates 161 or 157, gradually approaching central plate 159, then contacting with the other plates at the other side of said central plate and then to again interrupt said circuit 153, 154, after the circuit of the overload coil has been interrupted, and before the circuit of the other overload coil has been closed by angular motion of segment 148.

Let us examine now what happens when the plunger is moved from the position shown in Fig. 2 to the position shown in Fig. 3 owing to the energization of overload coil 132.

The overload coil is at first energized by the full current, causing the plunger to move away from switch 107′. Contact bar 168 presently connects contact plate 156 with contact plate 161, thus inserting in the circuit branch 153, 154, through resistances 162, 165, 166, the total resistance of the circuit being diminished to a certain extent.

The total amount of current passing through the circuit is practically unaffected, but the amount passing through the overload coil will be less, and will further decrease as contact bar 168 advances, cutting off resistances 166, 165. When bar 168 reaches contact plate 159 the current through the overload coil has reached its minimum, because a larger proportion of the current can pass through circuit 153, 154. Shortly after this, and while contact bar 168 still dwells against contact plate 159, the circuit becomes interrupted at 107′, lever 144 having passed central line C—C, and in this manner the overload coil circuit is interrupted at a relatively low amperage.

This position is shown in Fig. 3. Spring 138 now assumes control, and forces lever 144 to continue its travel in the same direction, increasing the resistance of circuit 153, 154, by gradually inserting resistances 163, 164; the amperage in said circuit, therefore, which had increased at the moment switch 107′ was interrupted, is again decreased, until the circuit is finally interrupted, either at the reversing switch, or at 164, or at 130, owing to the continued movement of lever 144. At this time, therefore, also the operating circuit is interrupted under low amperage conditions.

When lever 144 reaches its new position, the circuit of overload coil 132 will remain interrupted, while the circuit of overload coil 133 is now inserted through the closing of switch 131 by the action of segment 148; so that the next time the valve is operated, the same cycle will follow, but in the reverse direction.

If when switch 108′ is interrupted there should be no overload, the current will pass through overload coil 132 without affecting the plunger, and the circuit will eventually be interrupted at the reversing switch under said condition of no overload. This will be the case, for instance, when the travel of the valve is arrested at some intermediate point.

A unit type of apparatus for the operation of valves is illustrated in Figs. 4 to 8, and the elements thereof which are exposed, and the operation of which has been described in connection with the diagram, bear numbers corresponding to those on the diagram. The apparatus is substantially similar to those described in my previous patent applications; with the difference that while in all my previous types of apparatus a set of worm gears was employed between the motor and the power take-off shaft, in the present case I employ only spur gears or bevel gears. These not only are more efficient and more lasting than worm gears, but do entirely away with the necessity of constant lubrication, which is one of the problems created by the use of worm gears.

The nature of the apparatus and of the service for which it is intended, make it imperative that the same be in perfect working condition when needed; therefore, the necessity of good lubrication, makes it necessary to frequently inspect and test apparatus installed. In many cases valves are located in positions difficult of access, or at remote points, and frequent inspections are liable to excessively increase maintenance costs. Therefore I prefer to use a mechanism in the form of a complete unit with spur gears or bevel gears, or other equivalent types of gears where the circumferential speed of the driven element is equivalent to the circumferential speed of the driving element, whenever possible.

Figure 8:
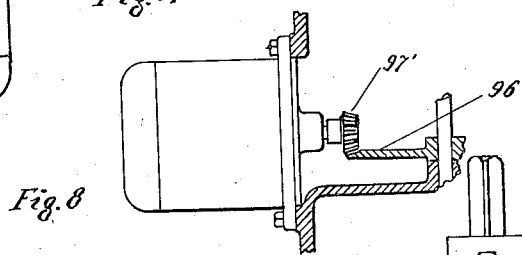
Fig. 8 is a fragmentary view of a detail in sectional front elevation, showing a modified type of drive for the apparatus shown in the other figures.
Figure 5:
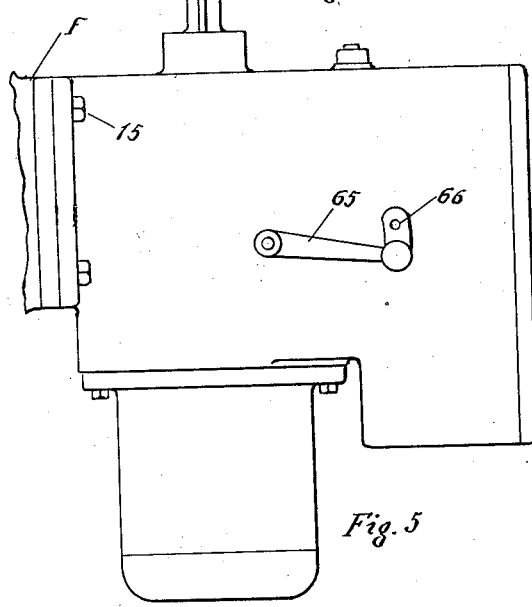
Fig. 5 is a side view in elevation of the same.
Figure 6:
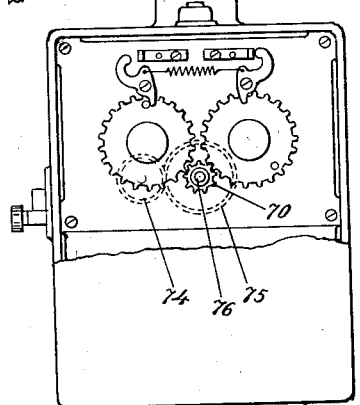
Fig. 6 is a front view in elevation of the same, partly broken away.

In the type of apparatus shown in the drawings, the motor rotates on a vertical axis; however, when space or other considerations should make it preferable, the motor may be mounted at one side of the casing, as shown in Fig. 8, and bevel pinion 97′ and gear 96′ may be used instead of spur gearing 97, 96.

From the foregoing, it is seen that I provide a novel and improved method of control, by means of an overload coil, whereby a device of the class described may be made both simple and reliable, and that I also provide means for carrying the invention into practice.

The invention may obviously be realized in ways different from those shown. For instance, the operation of the hand lever 65, which, it may be observed, causes interruption of the secondary circuit by switch S only after the mechanical connection of the motor to the operating mechanism has been made inoperative by the outward movement of sleeve 95, so as to insure interruption of the circuit under no load if the device is set for manual operation while running (contact plates 38', 40' of switch S being elongated for this purpose, as explained in my previous application No. 676,358), may also be caused to interrupt the operating circuit at the same time, as an added precaution, if desired. This may be done by an arrangement similar to that already described in connection with the diagram forming the object of my previous application No. 676,358. Such an arrangement is particularly useful when there being more than one unit in the system, it should be desirable to make it possible for each unit to be set for hand operation without interfering with the operation of the other units.

As now described, the locking arrangement of the controller's arms, prevents their operation when any one of the units is set for manual operation; so that the entire system may be made inoperative by the damaged condition or by the repairing or by the inoperativeness of one of its units.

If an arrangement such as described in said application No. 676,358, is substituted, and the locking arrangement for the controller's arms in their central position is omitted, the setting of a given unit for hand operation only affects the status of said unit, which will be entirely disconnected from the circuit; but the operation of the remaining units may proceed as usual. In such a case it may become desirable to insert in the system a selective arrangement for signaling the condition of each unit, concerning manual or motor operation, independently of the others.

Other details of construction may be changed without substantially departing from the spirit of my invention; I therefore reserve myself the right to carry my invention into practice in any way or manner which may be consented by, and which may fairly remain within the scope of the appended claims.

I claim:

1. In apparatus of the class described, the combination, with an electric circuit, a motor, and an operating mechanism connected thereto of an overload coil inserted in said circuit, and means associated with said operating mechanism for rendering said coil inoperative at certain times, and operative at other times.

2. In apparatus of the class described, the combination, with an electric circuit a motor, and an operating mechanism connected thereto and an overload coil inserted in said circuit, of means associated with said mechanism for setting said coil in operative or inoperative condition.

3. In apparatus of the class described, the combination, with an electric circuit a motor, and an operating mechanism connected thereto and an overload coil inserted in said circuit, of means for short circuiting said overload coil, and means associated with said mechanism controlling said short-circuiting means.

4. In apparatus of the class described, the combination, with an operating electric circuit a motor, and an operating mechanism connected thereto and a secondary circuit controlling said operating circuit, of an overload coil inserted in said operating circuit, means controlled by said secondary circuit, governing the operation of said overload coil, and means associated with said mechanism controlling the energization of said secondary circuit.

5. In apparatus of the class described, the combination, with an operating electric circuit a motor, and an operating mechanism connected thereto and a secondary circuit controlling said operating circuit, of an overload coil inserted in said operating circuit, means controlled by said secondary circuit, adapted to short-circuit said overload coil, and means associated with said mechanism controlling the energization of said secondary circuit.

6. In apparatus of the class described, the combination, with an electric circuit and an overload coil inserted in said circuit, of means independent of said overload coil for automatically interrupting said circuit, when certain predetermined conditions occur.

7. In apparatus of the class described, the combination, with an electric circuit and an overload coil inserted in said circuit, of means for rendering said overload coil operative or inoperative, and means independent of said overload coil, automatically controlling said circuit, when certain predetermined conditions occur.

8. In apparatus of the class described, the combination, with an operating electric circuit, a secondary controlling circuit therefor, and an overload coil inserted in said operating circuit, of means controlled by said secondary circuit adapted to automatically govern the operation of said operating circuit independently of said overload coil.

9. In apparatus of the class described, the combination, with an operating electric circuit, a secondary controlling circuit therefor, and an overload coil inserted in said operating circuit, of means controlled by said secondary circuit governing the operation of said overload coil, and governing the operation of said operating circuit independently of said overload coil.

10. In apparatus of the class described, the combination, with an electric motor and a circuit therefor, of a switch adapted to control said circuit, an overload coil inserted in said circuit, means for rendering said coil operative or inoperative, and automatic means adapted to cause said switch to control said circuit independently of said coil.

11. In apparatus of the class described, the combination, with a motor, an electric circuit therefor, and a switch adapted to control said circuit, of a secondary circuit governing the operation of said switch, an overload coil inserted in said motor circuit, and means controlled by said secondary circuit, governing the operation of said coil, and also governing the operation of said switch.

12. In apparatus of the class described, the combination, with a motor, an electric circuit therefor, and a switch adapted to control said circuit, of an overload coil inserted in said circuit, means for rendering said coil operative or inoperative, means controlled thereby locking said switch in its operative positions, and means causing said locking means to release said switch after said coil has been set into operative condition.

13. In apparatus of the class described, the combination, with a motor, an electric circuit therefor, and a switch adapted to control said circuit, of a secondary circuit governing the operation of said switch, an overload coil inserted in said motor circuit, means adapted to lock said switch in its operative positions, and means controlled by said secondary circuit, adapted to render said coil operative or inoperative, and governing the operation of said locking member, causing said locking member to release said switch only after said coil has been rendered operative.

14. In apparatus of the class described, the combination, with a motor, an electric circuit therefor, and a switch adapted to control said circuit, of an overload coil inserted in said circuit, means for rendering said coil operative or inoperative means for locking said switch in operative position, and means causing an interval of time to elapse between the setting of said coil in operative position, and the releasing of said means.

15. In apparatus of the class described, the combination, with a motor, an electric circuit therefor, an overload coil inserted in said circuit, and a switch adapted to control said circuit, of a secondary circuit governing the operation of said switch, and electro-magnetic means short-circuiting said coil, upon the energization of said secondary circuit.

16. In apparatus of the class described, the combination, with a motor, an electric circuit therefor, an overload coil inserted in said circuit, and a switch adapted to control said circuit, of a secondary circuit governing the operation of said switch, electro-magnetic means adapted to short-circuit said coil upon energization of said secondary circuit, and to restore the same to operative condition upon de-energization of said circuit, and means-controlling the operation of said switch, governed by said electro-magnetic means.

17. In apparatus of the class described, the combination, with a motor, an electric circuit therefor, an overload coil inserted in said circuit, and a switch adapted to control said circuit, of a secondary circuit governing the operation of said switch, electro-magnetic means adapted to short-circuit said coil upon energization of said secondary circuit, and to restore the same to operative condition upon de-energization of said circuit, and means controlling the operation of said switch, governed by said electro-magnetic means, causing said switch to interrupt said circuit only after said overload coil has been restored to operative condition.

18. In a control system of the character described, comprising an operating mechanism, an electric circuit controlling the same, and signaling means indicating the position of said operating mechanism, a resistance inserted in the circuit of said signaling means, insuring inoperativeness of said circuit in relation to said mechanism, independently of the resistance of said signaling means.

19. In apparatus of the class described, comprising a motor, an electric circuit, an operating mechanism adapted for manual operation or for operation by said motor, and means adapted to connect said mechanism to or to disconnect the same from said motor, means adapted to control said connecting and disconnecting means, without altering the electrical conditions in said circuit.

20. In apparatus of the class described, comprising a motor, an electric circuit, an operating mechanism adapted for manual operation or for operation by said motor, and means adapted to connect said mechanism to or to disconnect the same from said motor, means adapted to control said connecting and disconnecting means, at the same time controlling said circuit, and means adapted to control said connecting and disconnecting means, without altering the electrical conditions in said circuit.

21. In an operating unit, a casing, a motor attached thereto, a power take-off shaft, limit means controlled thereby governing the operation of said motor, and mechanism within said casing for operatively associating said motor with said shaft, said mechanism comprising sets of gears, all of which are composed of elements rotating at the same circumferential speed for each set.

22. In an operating unit, a casing, a motor attached thereto, a countershaft, a power take-off shaft, limit means controlled by said power take-off shaft governing the operation of said motor, a speed reducing gearing connecting said motor to said countershaft, and a speed reducing gearing connecting said countershaft to said power take-off shaft, each gearing being composed of elements rotating at the same circumferential speed.

23. In apparatus of the class described the combination with an operating mechanism, a motor and an electric circuit therefor, of an overload coil inserted in said circuit, and means associated with said mechanism for rendering said coil inoperative during certain periods of operation of the apparatus, and operative at certain other periods.

24. In apparatus of the class described the combination with an operating mechanism, a motor and an electric circuit therefor, of an overload coil inserted in said circuit, means for short circuiting said overload coil during certain periods of operation of the apparatus, to render said coil inoperative, and means for inserting said coil into the circuit at certain other periods, said means being associated with and controlled by said operating mechanism.

25. In apparatus of the class described, comprising a member traveling from one position to another, a motor and an electric circuit therefor, and an overload coil inserted in said circuit, means for rendering said overload coil inoperative during the major part of the travel of said member, said means rendering said overload coil operative when said member is about to reach the end of its travel.

26. In apparatus of the class described, the combination with an operating mechanism, a motor and an electric circuit therefor, and an overload coil inserted in said circuit, of means associated with said mechanism for rendering said coil inoperative during certain periods of the operation of the apparatus and operative at certain other periods, and means for interrupting said circuit independently of said coil, if no overload conditions should exist when the overload coil is in its operative condition.

27. In apparatus of the class described, comprising a member traveling from one position to another, a motor and an electric circuit therefor, an overload coil inserted in said circuit, means for rendering said overload coil inoperative during the major part of the travel of said member, said means rendering said overload coil operative when said member is about to reach the end of its travel, and means for interrupting said circuit independently of said overload coil, if no overload conditions should exist, when the overload coil is in its operative position.

28. In apparatus of the class described, the combination with an operating mechanism, a motor and an electric circuit therefor, of a switch and an overload coil inserted in said circuit, and means for interrupting said circuit by means of said switch when the operation of said apparatus is about to be terminated when no overload conditions exist, said means causing the circuit to be interrupted by said overload coil when overload conditions exist.

29. In apparatus of the class described, the combination with an operating mechanism, a motor and an electric circuit therefor, of a switch and an overload coil inserted in said circuit, and means for rendering said overload coil inoperative during the major part of the operation of the mechanism, said means rendering said coil operative when the operation of the mechanism is about to be terminated, and causing said circuit to be interrupted by means of said switch when no overload conditions exist and to become interrupted by the action of said overload coil when overload conditions do exist.

30. In apparatus of the class described comprising a member traveling from one position to another, an operating mechanism, a motor and an electric circuit therefor, a switch and an overload coil inserted in said circuit, means associated with said mechanism for short circuiting said overload coil during the major part of the travel of said member, means causing said short circuiting means to become inoperative and said overload coil to become operative when the travel of said member is about to be terminated, means associated with said short circuiting means causing said circuit to become inoperative by the action of said switch when no overload conditions exist, and means delaying the action of said short circuiting means upon said switch, permitting the operation of said overload coil previous to that of said switch if overload conditions do exist.

EDWARD F. CHANDLER.